United States Patent
El-Kersh et al.

(10) Patent No.: US 9,588,800 B2
(45) Date of Patent: Mar. 7, 2017

(54) METHOD AND A SYSTEM FOR PERFORMING A TWO-PHASE COMMIT PROTOCOL

(75) Inventors: Ehab El-Kersh, Cairo (EG); Mohamed Refaat Obide, Cairo (EG)

(73) Assignee: International Business Machines Corporation, Armonk, NY (US)

( * ) Notice: Subject to any disclaimer, the term of this patent is extended or adjusted under 35 U.S.C. 154(b) by 803 days.

(21) Appl. No.: 13/406,786

(22) Filed: Feb. 28, 2012

(65) Prior Publication Data

US 2012/0166889 A1    Jun. 28, 2012

Related U.S. Application Data

(62) Division of application No. 12/891,778, filed on Sep. 27, 2010.

(30) Foreign Application Priority Data

Sep. 28, 2009  (EP) ..................... 09171449

(51) Int. Cl.
  *G06F 11/14*  (2006.01)
  *G06F 9/46*   (2006.01)

(52) U.S. Cl.
  CPC .......... *G06F 9/466* (2013.01); *G06F 11/1474* (2013.01)

(58) Field of Classification Search
  CPC .................................................. G06F 11/1474
  USPC ................... 707/610, 611, 615, 634; 714/48, 714/E11.025; 718/100
  See application file for complete search history.

(56) References Cited

U.S. PATENT DOCUMENTS

| | | | |
|---|---|---|---|
| 2004/0019898 A1* | 1/2004 | Frey et al. ..................... | 719/330 |
| 2007/0053701 A1* | 3/2007 | Nagata et al. .................. | 399/24 |
| 2008/0037571 A1* | 2/2008 | Hetzel et al. ................. | 370/408 |
| 2008/0172674 A1* | 7/2008 | Yee et al. ...................... | 718/106 |
| 2009/0222823 A1* | 9/2009 | Parkinson et al. ............ | 718/101 |
| 2009/0313311 A1* | 12/2009 | Hoffmann et al. ........... | 707/204 |
| 2011/0078516 A1* | 3/2011 | El-Kersh et al. .............. | 714/48 |

OTHER PUBLICATIONS

"Introduction to Computer Science with C++", Lambert et al., 1996, pp. 626-637.*

* cited by examiner

*Primary Examiner* — Grace Park
(74) *Attorney, Agent, or Firm* — Steven M. Greenberg, Esq.; CRGO Law (57) ABSTRACT

The invention provides an enhanced two phase commit process to perform a transaction started by an application program and involving access to one or more resources managed by respective resource managers. The method comprises the steps of: enlisting the resource managers participating in the transaction, said enlisting step including associating a priority rank with each identified resource manager based on predefined priority rules; sending a prepare signal to said enlisted resource managers to begin the process of committing the transaction; and if a ready signal is received from all resource managers in response to the prepare signal, committing the resource managers in the order defined from the priority ranks associated with the resource managers.

16 Claims, 7 Drawing Sheets

METHOD AND A SYSTEM FOR PERFORMING A TWO-PHASE COMMIT PROTOCOL

CROSS-REFERENCE TO RELATED APPLICATIONS

This application is a Divisional of U.S. patent application Ser. No. 12/891,778, currently pending, filed on Sep. 27, 2010, which claims priority under 35 U.S.C. §119(a) to European Patent Application Serial Number 09171449.3, filed Sep. 28, 2009, entitled "A METHOD AND A SYSTEM FOR PERFORMING A TWO-PHASE COMMIT PROTOCOL", the entirety of which is incorporated herein by reference.

FIELD OF THE INVENTION

The invention generally relates to computer operating systems, and in particular to an enhanced commit two-phase protocol for distributed data processing systems.

BACKGROUND OF THE INVENTION

In distributed data processing systems, two-phase commit protocols are used to coordinate transactions. Distributed transactions are widely used today to allow a computer system interact with several resources, and apply changes to resources while ensuring data consistency. A two-phase commit protocol requires that all resources in a distributed system agree to commit a transaction, before it is committed. This ensures that either all resources commit the transaction or all resources abort the transaction. As a result, the changes made either all succeed (transaction is committed) or all fail (transaction is rolled back). When the transaction is committed, all the changes are made permanent. When the transaction is rolled back, all the changes already made are undone.

A distributed transaction involves three parties: an application program, a transaction manager and one or more resource managers. The application program uses a set of resource managers to execute its function. Resource managers are responsible for managing transactional resources. The application program also uses the transaction manager interface to define the transaction boundaries. In a prepare phase, the transaction manager first attempts to prepare all the resource enlisted in the transaction. During this prepare phase, the transaction manager polls all resource managers to determine if they are ready to commit the resources. If all resource managers agreed to commit, then the transaction manager starts a commit phase to complete the transactions at all resources.

In case of failure during the commit phase of the two-phase commit protocol, the data becomes inconsistent for some time until the recovery happens. A number of existing solutions are known to ensure failure recovery for two-phase commit operations.

In the article entitled "Inferring a Serialization Order for Distributed Transactions", IEEE Paper, ISBN: 0-7695-2570-9, a failure recovery solution is proposed that lies on an automatic execution of the commit order by data partition identifier through merging prepare log entries of all database partitions in one log, then sort these entries by partition identifier and perform the commit according to this sorting. In U.S. Pat. No. 6,363,401, data inconsistency is avoided by committing to the available resources and trying to commit to the unavailable resources later when they become available. Another solution to the above problem is described in U.S. Pat. No. 5,319,773. In U.S. Pat. No. 5,319,773 the failure recovery procedure comprises retrying to commit failed resources asynchronously while the application operates. In U.S. Pat. No. 5,319,774, there is disclosed a failure recovery solution consisting in performing cyclic attempts to commit the failed resources. These solutions all propose recovery procedures to limit data inconsistency in case of failure. However, these solutions do not provide a solution to data inconsistency until the recovery happens.

There is accordingly a need for a method and a system that efficiently control data inconsistency until data recovery, in case of failure during a two-phase commit procedure.

SUMMARY OF THE INVENTION

In order to address these and other problems, there is provided a method according to the appended independent claim 1, a computer program, a computer readable medium and a transactional system according to appended claims 9 to 11 respectively. Preferred embodiments are defined in the appended dependent claims.

With the invention, the application program can control the processing order of transaction manager on resource managers during the commit phase of the two-phase commit protocol.

In particular the invention made it possible for the application program to define a commit priority for each resource manager during the commit phase of the two-phase commit protocol. Accordingly, when the system encounters a partial failure, involving data inconsistency for a period of time until compensation routines execute, it becomes possible with the invention to control such data inconsistency based on priorities.

Further advantages of the present invention will become clear to the skilled person upon examination of the drawings and detailed description. It is intended that any additional advantages be incorporated herein.

BRIEF DESCRIPTION OF THE DRAWINGS

Embodiments of the present invention will now be described by way of example with reference to the accompanying drawings in which like references denote similar elements, and in which.

The drawings are intended to depict only typical embodiments of the invention, and therefore should not be considered as limiting the scope of the invention.

As they may be cited in the following description, Java and all Java-based marks are trademarks or registered trademarks of Sun Microsystems, Inc, in the United States and other countries.

A portion of the disclosure of this patent document contains material which may be subject to copyright protection. The copyright owner has no objection to the facsimile reproduction by anyone of the patent document or the patent disclosure, as it appears in the Patent and Trademark Office patent file or records, but otherwise reserves all copyright and/or author's rights whatsoever.

DETAILED DESCRIPTION

Figure 1:
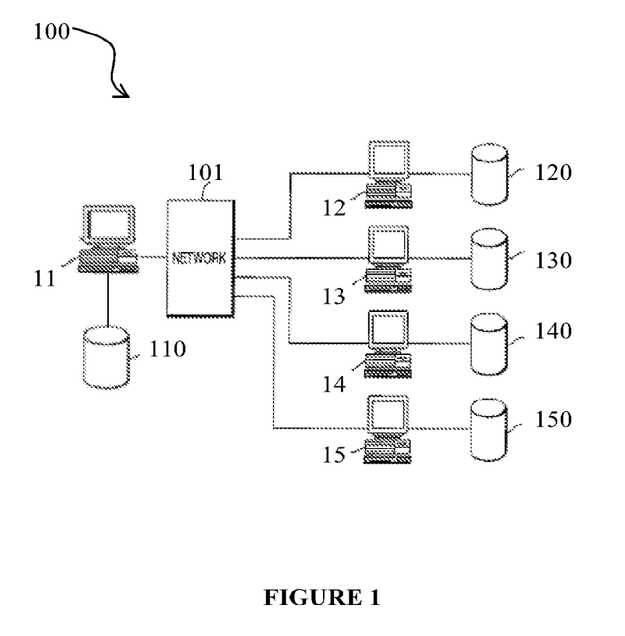
FIG. 1 shows an exemplary transactional environment.

FIG. 1 shows an exemplary transactional environment for implementing a transactional system 100 in accordance with the invention. This system 100 is a distributed network of computing devices such as servers and databases that are connected together by one or more networks such as the Internet and/or local networks. Messages flow between the components of the system.

System 100 includes a number of nodes 11, 12, 13, 14 and 15 interconnected through one or more communication networks 101. The nodes of the system cooperate with each other via the communication network 101 to process transactions that originate at one node 11.

Each node 11-15 may include a CPU with a main memory and disk storage, coupled by a system bus (not shown). Each node may be for example a desktop workstation, a computer acting as a server, or a shared system resource such as disk storage.

Each node 11-15 may further include a resource manager to manage interaction with a Log (not shown) and one or more resources, such as databases 120, 130, 140 and 150.

A two-phase commit allows an application requester such as node 11 and application servers such as nodes 12-15 to process a distributed transaction in a way that preserves data integrity across all processing nodes. All changes made to a resource 120-150 are logged in the logs so that they can be either rolled back, or committed.

Figure 2:
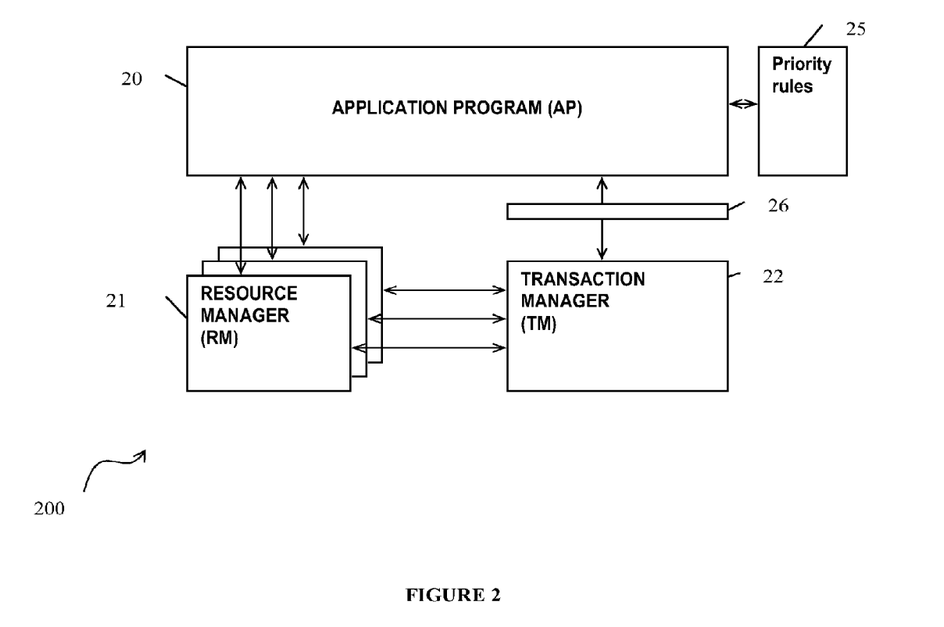
FIG. 2 shows a block diagram depicting a transactional system according to the invention.

FIG. 2 illustrates a transactional system 200 according to embodiments of the invention. The system comprises an application program 20, resource managers 21, and a transaction manager 22. The application program 20 receives predefined priority rules 25 to control the transaction manager 22 through interface 26.

The transaction is driven by the application program 20 at a given node that conducts transactions spanning multiple resources. The application program 20 instantiates and uses several resource managers 21, such as Resource manager A, B or C, during a transaction. Each resource manager 21 accepts operation messages (such as read/create/update/delete) from the application program 20 to its backend resources. Each resource involved in the transaction is managed by its respective resource manager 21.

The application program 20 defines transaction boundaries and the application-specific actions that form the transaction. The application program 20 may include database programs, word processors, and spreadsheets for example.

The transaction manager 22 coordinates the actions of the resource managers 21 that are located on the same node (local resource managers). The transaction manager 22 may also act as a transaction coordinator under specific circumstances where the resources needed by the application are on other nodes. In such circumstances, the transaction coordinator is the transaction manager on the same node where the application program started the transaction. If a transaction manager coordinates a transaction, that transaction is considered a global transaction. A global transaction represents multiple operations grouped into a single transaction, or a single unit of work, in which all changes within the transaction are either fully completed or fully rolled back. The transaction coordinator orchestrates the distributed transaction by communicating with transaction managers on the other nodes (remote transaction managers) and with resource managers on the same node (local resource managers).

As an exemplary transaction, an application program 20 may want to access some resources through resource managers 21, such as a database and use programming logic to manipulate the data. Each access request is passed to the appropriate resource managers through function calls specific to those resource managers.

According to the invention, the transactional system 100 includes an interface 26 between the transaction manager 22 and the application program 20 to allow control of the order of operation on the enlisted resource managers by the application program, and provide details about any partial failure (e.g. connection or H/W failure) that may occur during the commit phase of the two-phase commit protocol.

The application program 20 is responsible for associating a priority rank with each resource manager involved in the transaction based on priority rules 25 and for passing this rank information to the transaction manager 22 through interface 26. The priority rules may be received for example in the form of a weight, a sequence number, etc.

The application program 20 initially enlists the resource managers 21 involved in the transaction so that they can participate in the transaction. During enlistment of the resource managers, the application program associates them with a priority rank with each resource manager based on predefined rules. The resources are then involved in the transaction.

After enlistment of the resources managers 21, the application program 20 instructs the transaction manager 22 to commit the transaction. The transaction manager 22 then starts the two-phase commit protocol. The transaction manager 22 communicates directly with the resource managers 21 to execute the two-Phase Commit operation. During the prepare phase, the transaction manager 22 prepares the enlisted resource managers 21 in an arbitrary order or in the order in which the transaction manager 14 is made aware of their existence. During the prepare phase, the transaction manager sends a query to commit message to each resource manager 21. Each resource manager 21 executes the transaction up to the point they will be requested to commit, records the information it needs to commit the requested work and confirms that it can successfully commit the transaction by sending back an agreement message to the transaction Manager. If the resource manager 21 cannot successfully commit the transaction, it sends back an abort message to the transaction manager. If one resource manager replied with an abort message during the prepare phase, the transaction manager sends a rollback message to all resource managers in order to have them undo the transaction. Each resource manager then undoes the transaction and sends an acknowledgement message to the transaction manager once completed.

The transaction manager 21 starts a commit phase to order the commit procedure to all resource managers 21 only if all resource managers replied with an agreement message in the commit-request phase.

Based on the priority rank information received from the application program, the transaction manager 22 follows a specific order when sending commit requests to the different resource managers during the commit phase of the two-phase commit operation. Each resource manager 21 sends an acknowledgment message to the transaction manager after completing the operation.

In case of failure, the transaction manager 21 will send a detailed error report to the application program through interface 26 using priority rank information to identify which resource manager specifically failed to commit either because it did not respond at all or responded negatively to the transaction manager. More specifically, the transaction manager may report which ranks have been successfully committed and which have failed. In case in the same rank some resource managers have succeeded and some have failed, the transaction manager reports both.

Figure 3:
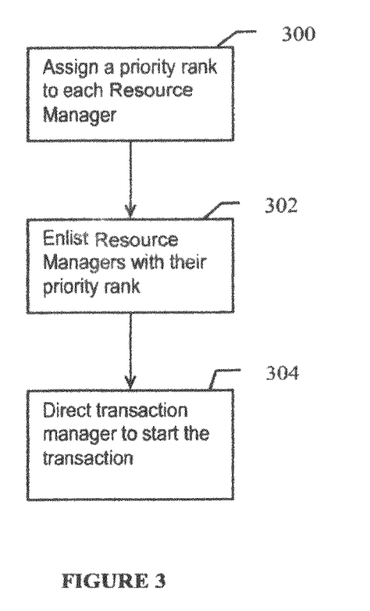
FIG. 3 shows a flowchart describing initiation of a two-phase commit phase according to the invention.

FIG. 3 is a flowchart showing the enlistment of Resource managers according to the invention.

During the enlistment phase, the application program ranks the significance of the resource managers.

In step 300, the application program assigns a priority rank to each resource manager based on predefined priority rules.

In step 302, to enlist the resource managers, the application program 20 adds the resource managers in association with their ranks to the transaction manager 22. More specifically, it passes to the transaction manager the application identifier, the resource manager identifier and the resource manager priority rank to enlist each resource manager.

In step 304, the application program directs the transaction manager on the same node to start executing the transaction. This transaction manager becomes the transaction coordinator.

Figure 4:
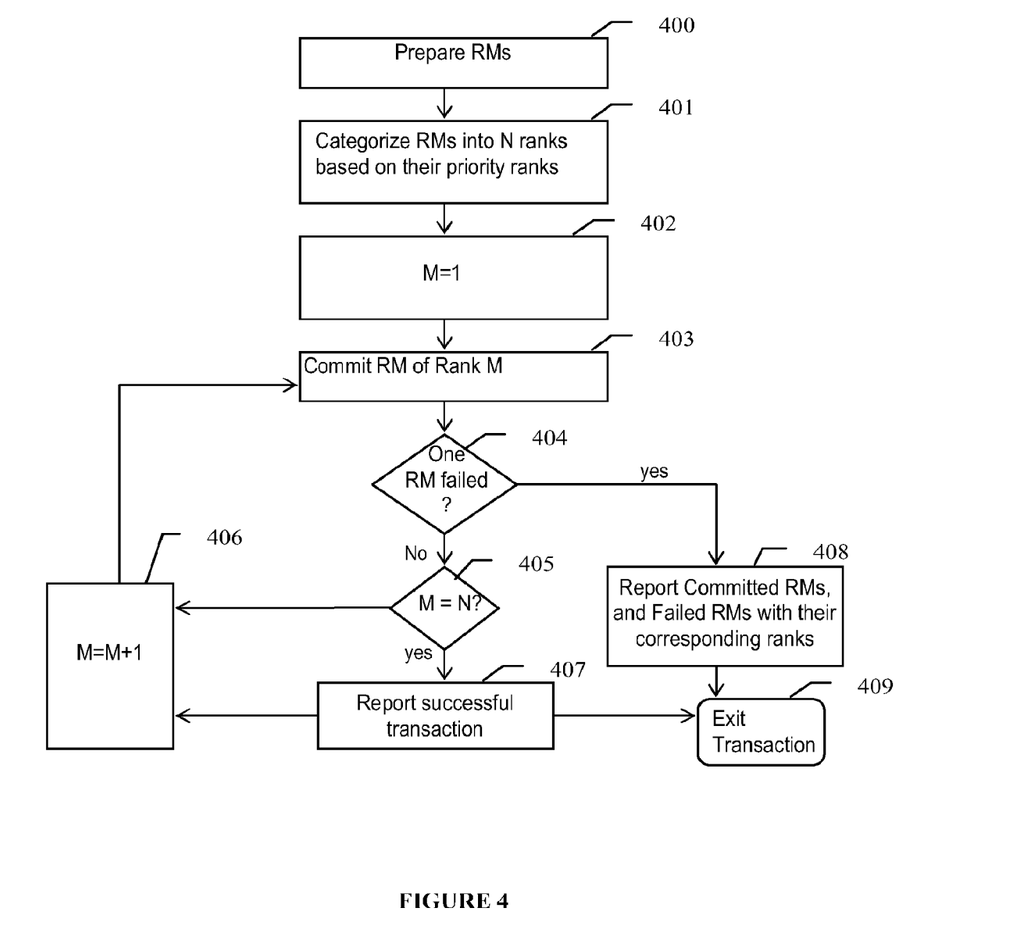
FIG. 4 shows a flowchart describing the commit phase of the two-phase commit protocol according to the invention.

FIG. 4 shows in more details the commit processing performed by transaction manager 22 acting as the transaction coordinator.

In step 400, the transaction manager prepares the resource managers. More specifically, when the application program 20 is ready to commit all the changes to the resource managers 21 participating in the transaction (message sent in step 304 of FIG. 3), all the nodes in the transaction are notified to execute the prepare phase of the two-phase commit protocol to prepare all the enlisted resource managers. During the prepare phase, the transaction manager 22 asks each resource manager participating in the transaction whether or not it is prepared to commit the transaction. At this stage, the transaction manager may process the resource managers in any order.

If all the resource managers replied with an agreement message, the commit phase can be started in step 401.

In step 401, the transaction manager 22 sorts the resource managers 21 and categorizes them into N ranks based on their priority ranks. The priority ranks are then stored in memory.

In step 402, the transaction manager 22 defines a processing parameter M and sets it to initially equal to 1.

The transaction manager 22 then starts the commit phase to instruct the resource managers to commit the changes to their data. To perform the commit phase, the transaction manager 22 commits the resource managers according to their ranks M from the highest ranked resource manager to the lowest ranked resource manager.

More specifically, in step 403, the transaction manager instructs the Resource manager of rank M to commit the changes to its data. In step 404, the transaction manager checks if one or more resource managers failed. If no failure occurred and if all the resource managers have not yet been processed (step 405), then the transaction manager increments rank parameter M by one in step 406, and repeats steps 403 to 405 for the next resource manager of new rank M.

If a failure happened during the commit phase, the transaction manager 22 sends reporting information to the application program to identify the resource managers that succeeded and the resource managers that failed in step 408. The reporting information includes the ranks associated with the resource manager, for each resource manager.

If no failure happened (step 404) and if it is determined in step 405 that all the resource managers have been processed (M=N), then all resource managers committed successfully and the transaction Manager reports the transaction completion in step 407.

In step 409, the transaction exits after either failure or successful completion.

It should be understood that the notion of "Ranking" as used in the invention is different from the notion of breaking down a global transaction into set of separate transactions so as to execute the separated transactions independently. When separating one transaction into set of elementary transactions, data integrity check is lost in the "prepare" phase of the two phase protocol. Further, the risk that failure occurs during execution of the whole set of elementary transactions is increased because the resources are unlocked between the elementary transactions and the period of time between committing the transactions is more important.

Figure 5:
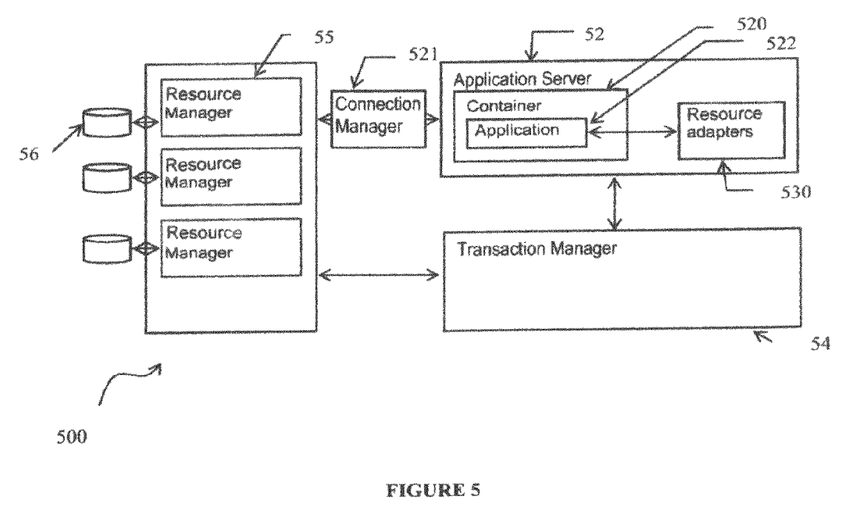
FIG. 5 schematically illustrates a transactional system for managing transactions in an object-oriented environment, according to certain embodiments of the invention.

FIG. 5 shows a transactional system 500 for managing transaction in an object-oriented environment, according to certain embodiments of the invention.

Transactional system 500 allows for controlling a two-phase commit procedure in object-oriented environment where resources such as databases are accessed via DataSource objects, like for example in a J2EE architecture. Transactional system 500 may be used to ensure that when a transaction commits or rolls back, all the changes made by the objects involved in the transaction are either committed or undone as a group.

According to these embodiments of the invention, the application program manages priority rank information using connection structures to connect an application to a resource involved in a transaction. The priority rank determined for each resource manager may be added in a configuration file when creating a connection to the resources and then passed to the transaction manager. In J2EE environment, such configuration file is called a dataSource deployment descriptor, the DataSources being used to describe the resource manager (RM) type.

More specifically, transactional system 500 includes an application server 52, one or more resource managers 55, and a transaction manager 54. The Application Server 52 provides infrastructure required to support the application run-time environment.

The resource managers 55 manage access to respective databases 56. Each resource manager cooperates with transaction manager 54 to commit initiation and perform failure recovery. An example of resource manager could be a database server.

The application server 52 includes an application container 520, and a connection manager 521. The connection manager 521 supplies the resources to the application and enlists the resources with the transaction manager.

The application server 52 may also include Resource Adapters 530 forming a pluggable interface to provide standard access to resource managers 54. The application server 52 may use resource adapters 530 to obtain API objects that in turn know how to connect to their resource managers 55 (there is a one-to-one correspondence between resource adapters and resource managers). The Application Server 52 passes these objects to the transaction manager 54 which in turn manages the actual transaction process.

The application container 520 holds a number of applications 522. The application container 520 is where a user can deploy an application to run. It represents a managed environment where an application has certain services available to it, such as connection management and transaction management. Depending on how the managed environment is defined, the applications can have varying granularity, such as at the component level. For example an application 522 may be a standalone application, or include a number of components and modules.

The transaction manager 54 collects the votes from the resources and determines the outcome in the prepare phase of the two phase commit protocol. The transaction manager 54 is also responsible for sorting the resources based on the ranks assigned by an application program.

In an exemplary application of the invention, the application Server is a J2EE (Java Enterprise Edition) Application server containing an EJB (Enterprise JavaBeans) container. J2EE applications manage transactions from java programs running outside of the J2EE Application Server or J2EE Applications can run within the context of a J2EE Container and invoke transactions from EJBs, JSPs and native Servlets. The EJB Container has special features to simplify transaction management using either declarative transactional semantics within deployment descriptors or programmatic transaction management using JTS interfaces.

The transaction manager 54 called by an application invoking a two-phase commit transaction takes the role of a transaction coordinator on the given node where the transaction manager was called. This coordinator may enlist the help of transaction managers on other nodes involved in the distributed transaction. The transaction managers in turn communicate with their respective resource managers to carry out the individual transactions.

When an application 522 wants to access a database or some other transactional resources 56, it can acquire a connection to the corresponding resource manager 55. Such connection is acquired from a DataSource.

A DataSource has a set of properties that identify and describe the real world data source that it represents. These properties include information such as the location of the database server, the name of the database, the network protocol used to communicate with the server, and so on.

Applications 522 may access a data source using a connection, and a DataSource object can be thought of as a factory for connections to the particular data source that the DataSource instance represents.

Datasources may be defined using J2EE DataSource deployment descriptors. Data source descriptors provide a mechanism whereby applications can locate and communicate with databases.

Figure 6:
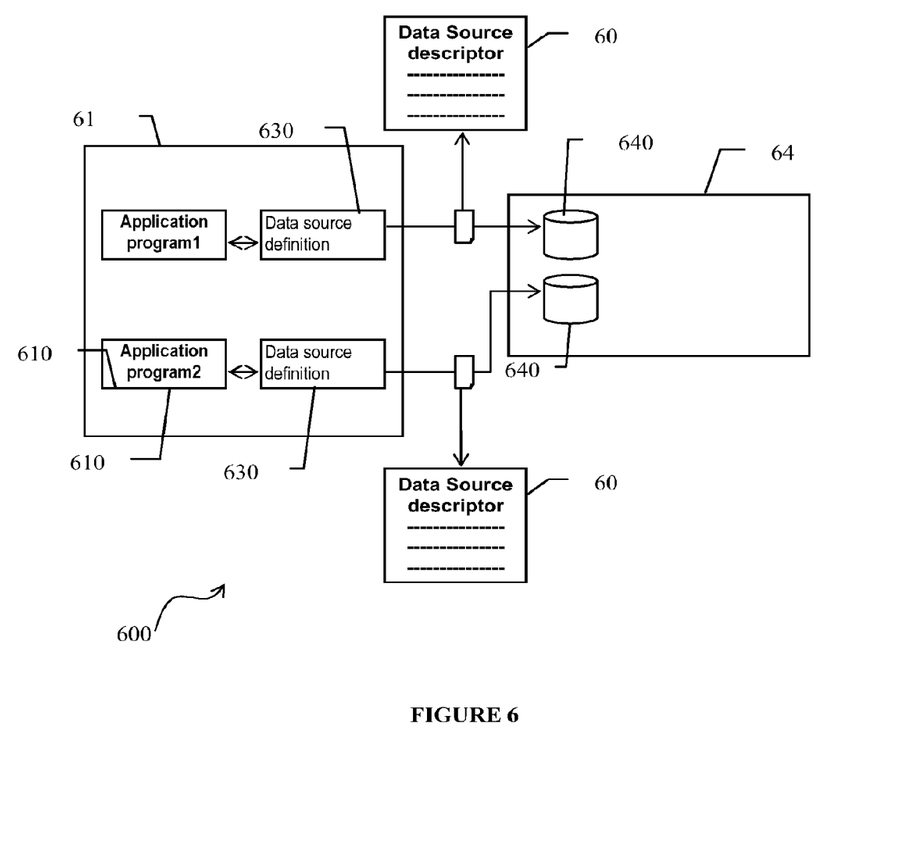
FIG. 6 schematically illustrates a transactional system using dataSource descriptors according to certain embodiments of the invention.

FIG. 6 depicts how data source descriptors are used according to an exemplary embodiment of the invention. The application container in the application server 61 includes a number of application 610. Each application 610 provides a dataSource definition 630 to obtain connection to a particular database 640 in the database server 64, using a DataSource descriptor 60. A data source descriptor 60 may be a file, generally an XML (Extensible Markup Language) file, that contains a name and data that identify a resource such as a database. An application 610 looks up a data source descriptor by its name, then uses the associated information from the document to locate and bind to the database 640. Each application 610 specifies a data source, which provides a path to the database 640 it will use to store data. Although each application 610 can be assigned a unique data source, it is not a required. All applications 610 could even be configured to utilize the same database 640.

The dataSource name specified in the data source field of the data source descriptor is used to map the data source name with a particular database. Each deployment descriptor of the Data Source also specifies a priority rank for all connection objects created using this Data Source. If one application 610 creates more than one connection using the same DataSource during the same transaction, all these connections will be assigned the same rank during the commit operation and the order of committing them will be arbitrary.

Alternatively, after getting the connection from the factory (the DataSource), an API (Application Programming Interface) as interface 26 could be used to set the priority of the connection object. The transaction manager then exposes the API for the use by the application program to receive the rank of the resource manager during enlistment of the resource manager in the transaction. In this way, the application program 610 will be able to control several connection objects created using the same connection factory (DataSource).

An exemplary Data Source deployment descriptor for Websphere Application Server is described below:

```
"<factories  xmi:type="resources.jdbc:DataSource"  xmi:id="DataSource_122"
name="My   DB2   XA   DataSource"     jndiName="jdbc/MyXADataSource"
description="DB2 Universal Driver Datasource" providerType="DB2 Universal
JDBC Driver Provider (XA)"
</propertySet>
<resourceProperties                       xmi:id="J2EEResourceProperty_122"
name="commitPriority" type="java.lang.Integer" value="1" description=""
required="true" />
.
.
</propertySet>
.
.
</factories>"
```

The following section from this example defines the priority rank ("CommitPriority") associated with the resource manager:

```
"<resourceProperties          xmi:id="J2EEResourceProperty_122"
  name="commitPriority" type="java.lang.Integer" value="1" description=""
  required="true" />"
```

This section includes several fields such as name, data type, default value.

Further, in the exemplary deployment descriptor, the expression "name="My DB2 XA DataSource" identifies the data source name as it is specified for a given application 610.

The skilled person will easily understand that the invention is not limited to the format of the data source descriptor used in the above example for illustrative purposes.

Figure 7:
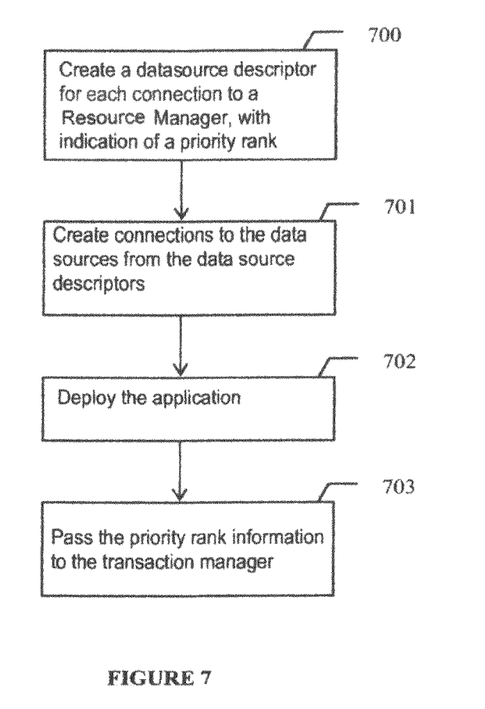
FIG. 7 is a flowchart describing the commit phase of the two phase commit protocol according to certain embodiments of the invention.

FIG. 7 is a flowchart describing the commit phase of the two phase commit protocol according to this exemplary embodiment of the invention.

In step 700, the application program creates deployment descriptors defining connections to resource managers at deployment time. In J2EE like environments, each deployment descriptor is represented as an XML file which can be manipulated using any XML parser. Each dataSource descriptor specifies a priority tag for a resource manager according to predefined priority rules such as business priority rules. Further, in J2EE environments, each deployment descriptor is represented as an XML file which can be manipulated using any XML parser.

In step 701, the application program then creates the connections to the data sources and in step 702 it deploys the application. In the application program code during one transaction, it is preferred to get one connection from each data source for full control on commit order.

In step 703, the application passes the priority rank information defined for the resource managers to the transaction manager. The application program can retrieve the rank from the descriptor of each dataSource and pass it to the transaction manager during enlistment of the resource managers in the transaction. Alternatively, the resource manager itself can get the priority rank directly from its dataSource descriptor, and then provide it to the transaction manager during the enlistment.

The transaction manager will retrieve the priority tags from the deployment descriptors and use them to control the order in which it sends the commit messages to the different resource managers during the commit phase.

In case of failure, the application program will receive a detailed report from the transaction manager with information about which resource manager failed to commit using the rank information.

The invention can be applied to the Open Group XA two-phase commit protocol to ensure that all participating processing nodes receive and implement the same action regardless of local or network failure. For example, the invention can be applied to an event processing system that uses an XA transaction to perform the following tasks:

Reading events from a first source storage S1 (such as a database or a JMS queue or topic) using an XA resource manager RM1 to access that storage; examples for source storages include a database or a JMS queue or topic, Writing events to a second source storage S2 for later processing using a second XA resource manager RM2, and Using the first resource manager RM1 to delete the collected events from the first source storage S1.

While it is critical to lose any event under any circumstances, it is affordable to have duplicate events in the processing store. In order to achieve these priorities thereby ensuring efficient event delivery to the processing store, the application program will perform the following steps according to the invention:

1. Create an XA data source for the event source store S1 (named for example "XAEventSourceDS") with a low commit priority rank P1 which for example is set to 2;
2. Create an XA data source for the target store S2 (named for example "XAEventTargetDS") for processing with a high commit priority rank P2 which for example is set to 1;
3. Use the two data sources defined above to create two connections as follows:
   a connection to resource manager RM1 from XAEventSourceDS
   a connection to resource manager RM2 from XAEventTargetDS;
4. Read an event chunk into memory using resource manager RM1, and then delete them;
5. Write events to target store S2 using resource manager RM2.

When committing this XA transaction, the transaction manager TM will commit work done on resource manager RM2 before resource manager RM1 as set by the priority ranks The invention accordingly allows for control of the commit order from the application level while leaving the transaction managed by the transaction manager. Further, the application program can control on the order in which the transaction manager commits or rolls back resource managers during the two-phase commit protocol. During the commit phase, the transaction manager sends a commit message or a roll back message on all prepared resource managers in an order determined from priority requirements defined by the application program.

The interface created between the application program and the transaction program to manage priority rank information can be used in case of failure to provide the application program with information related to failed/commited resource managers. With the ranking information, the application program and the transaction manager can handle resource manager commitment and failure and exchange with each other about the commitment of each resource. In particular, in case of failure during the commit phase of the two-phase commit protocol, the application program can specify which Resource manager is more important than the others, and hence should be committed before them. In addition, the application program can obtain details about any partial failure (e.g. connection or H/W failure) that may occur during the commit phase regarding which resource manager exactly failed to commit. In this way, the application program can react according to which rank has been committed and which has not been committed while in the prior art solutions with random commit, the application program was not able to handle all random cases. Further, if a resource manager fails to respond or responds negatively during the commit phase, the transaction manager can report to the application program which ranks have passed and which has not.

With the invention, each application program can set the priority of different backend systems updated during the transactions, based on different requirements such as business requirements. Hence, the application program can commit the more important resources first.

Accordingly, the application program can decide the type of data inconsistency that can be tolerated according to different priority rules in case a partial failure takes place.

Further, the ordering of resource managers is enforced by the application (based on the priority rules) and not affected by access intent (i.e. which resource is being accessed more) at run time and is not subject to change.

As recovery actions are executed only when the cause of the failure is determined, such as for example when network failure is repaired, recovery is performed as soon as possible until the error is fixed (e.g. until network failure is fixed), and until then data inconsistency occurs. The invention makes it possible for an application to select the types of inconsistency that are allowable or not allowable during this period of time where inconsistency is unavoidable. The invention thus provides control on what type of inconsistency is allowed for that period of time based on priorities rules.

The invention can be realized in hardware, software, or a combination of hardware and software. The invention can be realized in a centralized fashion in one computer system, or in a distributed fashion where different elements are spread across several interconnected computer systems. Any type of computer system or other apparatus adapted for carrying out the methods described herein is appropriate. A typical combination of hardware and software can be a general purpose computer system with a computer program that, when being loaded and executed, controls the computer system such that it carries out the methods described herein.

The invention can be embedded in a computer program product, such as magnetic tape, an optically readable disk, or other computer-readable medium for storing electronic data. The computer program product can comprise computer-readable code, defining a computer program, which when loaded in a computer or computer system causes the computer or computer system to carry out the different methods described herein. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The preceding description of preferred embodiments of the invention has been presented for the purposes of illustration. The description provided is not intended to limit the invention to the particular forms disclosed or described. Modifications and variations will be readily apparent from the preceding description. As a result, it is intended that the scope of the invention not be limited by the detailed description provided herein.

The invention claimed is:

1. A method of performing a two phase commit process for a transaction started by an application program and involving access to one or more resources managed by respective resource managers, wherein it comprises the steps of:
    enlisting the resource managers participating in the transaction, each executing in a node comprising a central processing unit (CPU), main memory and fixed storage, said enlisting step including associating a significance-based priority rank with each identified resource manager based on priority rules predefined by the application program to control data inconsistency for a period of time when a failure occurs during a commit phase until recovery happens;
    sending a prepare signal to said enlisted resource managers to begin the process of committing the transaction; and
    if a ready signal is received from all resource managers in response to the prepare signal, committing the resource managers in the order defined from the priority ranks associated with the resource managers.

2. The method of claim 1, wherein the enlisting step is performed at deployment time.

3. The method of claim 1, wherein, the enlisting step further comprises storing the priority rank in memory.

4. The method according to claim 1, wherein the enlisting step comprises using a connection structure for connection to each resource managed by a resource manager, said connection structure including the name of the resource and the associated priority rank.

5. The method according to claim 4, wherein said connection structure includes a configuration file and the enlisting step further comprises exposing the priority ranks through an application program interface to provide priority rank information to said application program.

6. The method of claim 5, wherein said configuration file includes data source deployment descriptors, each deployment descriptor being defined by said application program for connection to at least one resource managed by a resource manager, said data source deployment descriptor including the name of the resource and the priority rank associated with said resource manager.

7. The method of claim 1, wherein the committing step comprises generating an error message in response to a failure occurring during the commit phase, said error message identifying the resource managers that failed to commit and the resource managers that succeeded to commit, said error message further including the priority ranks associated with the resource managers to identify said resource managers.

8. The method of claim 1, wherein the committing step comprises generating an error message in response to a resource manager failing to respond or responding negatively during the commit phase, said error message including the priority rank associated with said resource manager.

9. A computer program product comprising a non-transitory computer readable medium having stored thereon instructions for carrying out a method of performing a two phase commit process for a transaction started by an application program and involving access to one or more resources managed by respective resource managers when said computer program is executed on a computer device, the method comprising:
    enlisting the resource managers participating in the transaction, each executing in a node comprising a central processing unit (CPU), main memory and fixed storage, said enlisting step including associating a significance-based priority rank with each identified resource manager based on priority rules predefined by the application program to control data inconsistency for a period of time when a failure occurs during a commit phase until recovery happens;

sending a prepare signal to said enlisted resource managers to begin the process of committing the transaction; and if a ready signal is received from all resource managers in response to the prepare signal, committing the resource managers in the order defined from the priority ranks associated with the resource managers.

10. The computer program product of claim 9, wherein the enlisting step is performed at deployment time.

11. The computer program product of claim 9, wherein, the enlisting step further comprises storing the priority rank in memory.

12. The computer program product of claim 9, wherein the enlisting step comprises using a connection structure for connection to each resource managed by a resource manager, said connection structure including the name of the resource and the associated priority rank.

13. The computer program product of claim 12, wherein said connection structure includes a configuration file and the enlisting step further comprises exposing the priority ranks through an application program interface to provide priority rank information to said application program.

14. The computer program product of claim 13, wherein said configuration file includes data source deployment descriptors, each deployment descriptor being defined by said application program for connection to at least one resource managed by a resource manager, said data source deployment descriptor including the name of the resource and the priority rank associated with said resource manager.

15. The computer program product of claim 9, wherein the committing step further comprises generating an error message in response to a resource manager failing to respond or responding negatively during the commit phase, said error message including the priority rank associated with said resource manager.

16. The computer program product of claim 9, wherein the committing step further comprises generating an error message in response to a failure occurring during the commit phase, said error message identifying the resource managers that failed to commit and the resource managers that succeeded to commit, said error message further including the priority ranks associated with the resource managers to identify said resource managers.

* * * * *